(12) United States Patent
Jang et al.

(10) Patent No.: US 8,574,751 B2
(45) Date of Patent: Nov. 5, 2013

(54) SECONDARY BATTERY WITH PROTECTIVE CIRCUIT BOARD AND SECONDARY PROTECTIVE ELEMENT

(75) Inventors: Youngcheol Jang, Yongin-si (KR);
Nohyun Kwak, Yongin-si (KR);
Sangjoo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 820 days.

(21) Appl. No.: 11/941,041

(22) Filed: Nov. 15, 2007

(65) Prior Publication Data

US 2008/0118820 A1 May 22, 2008

(30) Foreign Application Priority Data

Nov. 21, 2006 (KR) .................. 10-2006-0115245

(51) Int. Cl.
*H01M 2/00* (2006.01)
*H01M 2/02* (2006.01)
*H01M 2/04* (2006.01)
*H01M 10/48* (2006.01)
*H01M 10/50* (2006.01)

(52) U.S. Cl.
USPC .............. 429/170; 429/62; 429/90; 429/91; 429/92; 429/163; 429/167; 429/176; 429/178; 429/179

(58) Field of Classification Search
USPC ......... 429/62, 90, 91, 92, 163, 167, 170, 176, 429/178, 179
See application file for complete search history.

(56) References Cited

U.S. PATENT DOCUMENTS

| 6,432,575 | B1 * | 8/2002 | Yamagami | 429/100 |
| 2004/0257036 | A1 * | 12/2004 | Kim | 320/112 |
| 2005/0200447 | A1 * | 9/2005 | Chandler et al. | 338/25 |
| 2006/0044728 | A1 * | 3/2006 | Kim et al. | 361/103 |

FOREIGN PATENT DOCUMENTS

| JP | 2002-246010 | 8/2002 |
| JP | 2002-289160 | 10/2002 |
| JP | 2003-223872 | 8/2003 |
| KR | 10-2005-0054800 | 6/2002 |
| KR | 10-2005-0077480 | 8/2005 |
| KR | 10-2005-0097699 | 10/2005 |
| KR | 614278 B1 * | 8/2006 |

OTHER PUBLICATIONS

Machine translation of JP 2002246010 A, Kusanagi, Aug. 2002.*
Machine translation of KR 1020050077480, Moon et al., Aug. 2005.*
Patent Abstracts of Japan, Publication No. 2002-246010; Date of Publication: Aug. 30, 2002; in the name of Kenichi Kusanagi.
Patent Abstracts of Japan, Publication No. 2003-223872; Date of Publication: Aug. 8, 2003; in the name of Masanori Narutomi.
Korean Patent Abstracts, Publication No. 1020050077480 A; Date of Publication: Aug. 2, 2005; in the name of Cheol Woong Lee et al.

* cited by examiner

Primary Examiner — Sean P Cullen
(74) Attorney, Agent, or Firm — Christie, Parker & Hale, LP

(57) ABSTRACT

A secondary battery with a protective circuit module including a rechargeable bare cell having a first electrode and a second electrode and a protective circuit board having a protective circuit for the rechargeable bare cell. A conductive bonding layer is located on the protective circuit board and a secondary protective element assembly is attached to the protective circuit board by the conductive bonding layer. A first lead plate electrically connects the secondary protective element assembly to the first electrode, and a second lead plate electrically connects the protective circuit board to the second electrode.

8 Claims, 3 Drawing Sheets

SECONDARY BATTERY WITH PROTECTIVE CIRCUIT BOARD AND SECONDARY PROTECTIVE ELEMENT

CROSS-REFERENCE TO RELATED APPLICATION

This application claims priority to and the benefit of Korean Patent Application No. 10-2006-0115245, filed on Nov. 21, 2006, the entire content of which is incorporated herein by reference.

BACKGROUND

1. Field of the Invention

The present invention relates to a secondary battery with a protective circuit module.

2. Description of the Prior Art

Generally, as portable wireless devices such as video cameras, cellular phones, portable computers, and the like have become more lightweight and increasingly developed, research has been conducted on secondary batteries used for driving such devices. Secondary batteries are rechargeable and can be compact, yet have a high capacity. Conventional secondary batteries may be, for example, nickel-cadmium batteries, nickel-hydrogen batteries, nickel-zinc batteries, lithium secondary batteries, and the like. Lithium secondary batteries are widely used among other reasons, due to their high operating voltage and high energy density per weight.

Secondary batteries may be classified into cylinder type batteries using a cylindrical aluminum can, rectangular type batteries using a rectangular aluminum can, and pouch type batteries housed in a thin pouch case.

In rectangular secondary batteries, a bare cell is formed by stacking an anode plate, a cathode plate and a separator and winding them to form an electrode assembly. The electrode assembly is then inserted into a rectangular metal can, and an open portion of the rectangular can is sealed by a cap plate to form a bare cell. Furthermore, an insulated electrode terminal is provided on the cap plate, wherein the electrode terminal forms one electrode of the secondary battery, and the cap plate and the can form the other electrode.

A protective circuit module (PCM) including a secondary protective element such as a positive temperature coefficient (PTC) element and a protective circuit board may be mounted on the upper part of the bare cell as a safety device for the secondary battery.

The PTC element functions as a conductor at normal temperature, and but ceases to function as a conductor when electric resistance is increased in proportion to increased surrounding temperature or is otherwise subjected to relatively high temperatures. Typically, the PTC element is connected to the protective circuit board by spot welding.

In conventional secondary batteries, after an electrically conductive nickel (Ni) plate is attached to a protective circuit board, a PTC element is coupled to the electrically conductive plate by spot welding. In order to couple the PTC element to the protective circuit board, equipment, such as a welding jig, is needed, and a relatively complicated connection operation is required. Further, since the electrically conductive nickel plate is attached to the protective circuit board by surface mount technology (SMT), the production cost of the secondary battery is relatively high. Additionally, due to the relatively high temperature applied to the PTC element by welding during assembly, the functionality of the PTC element may deteriorate.

SUMMARY OF THE INVENTION

A secondary battery with a protective circuit module is provided including a rechargeable bare cell having a first electrode and a second electrode and a protective circuit board having a protective circuit for the rechargeable bare cell. A conductive bonding layer is located on the protective circuit board and a secondary protective element assembly is attached to the protective circuit board by the conductive bonding layer. A first lead plate electrically connects the secondary protective element assembly to the first electrode, and a second lead plate electrically connects the protective circuit board to the second electrode. As used herein, a lead plate is an electrically conductive plate that may comprise any electrically conductive material.

The conductive bonding layer may be a thermal bonding layer or may be solder. The rechargeable bare cell may be rectangular having a first side (or lateral side) and a second side, the rechargeable bare cell further comprising an insulated electrode terminal on the first side, and wherein the protective circuit board is on the second side.

The secondary protective element assembly may include a connecting plate bonded to the protective circuit board by the conductive bonding layer. More specifically, the connecting plate may include a first connecting portion in contact with the conductive bonding layer, a coupling portion extending from the first connecting portion, and a second connecting portion substantially parallel to the first connecting portion. The first connecting portion may have a plurality of through holes allowing the conductive bonding layer to penetrate therethrough. The protective circuit board may include a plurality of protective circuits surface-mounted on a printed circuit board.

BRIEF DESCRIPTION OF THE DRAWINGS

The above and other aspects according to exemplary embodiments of the present invention will be apparent from the following detailed description and the accompanying drawings, in which.

DETAILED DESCRIPTION

Figure 5:
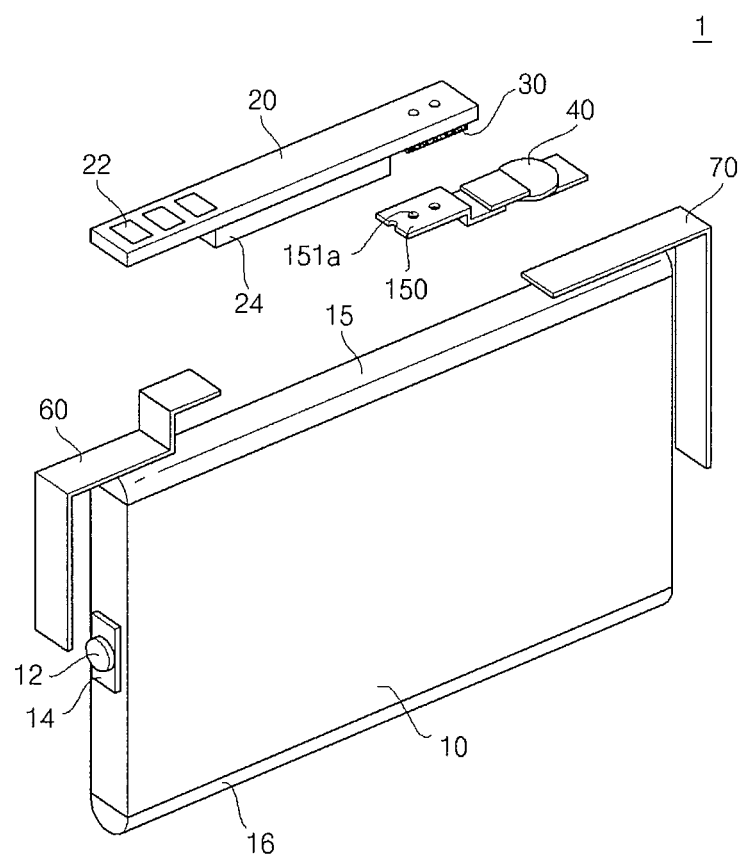
FIG. 5 is an exploded perspective view illustrating a secondary battery to which protective circuit module according to an exemplary embodiment of the present invention is attached.

Referring to FIG. 5, a secondary battery 1 according to an exemplary embodiment of the present invention includes a bare cell 10 and a protective circuit module comprising a protective circuit board 20, a conductive bonding layer 30, a secondary protective element 40, a connecting plate 150, and first and second lead plates 60, 70. An external terminal 22 for electrical connection of the secondary battery to external electronic equipment, such as a mobile telephone, may be mounted on the protective circuit board 20.

Figure 1:
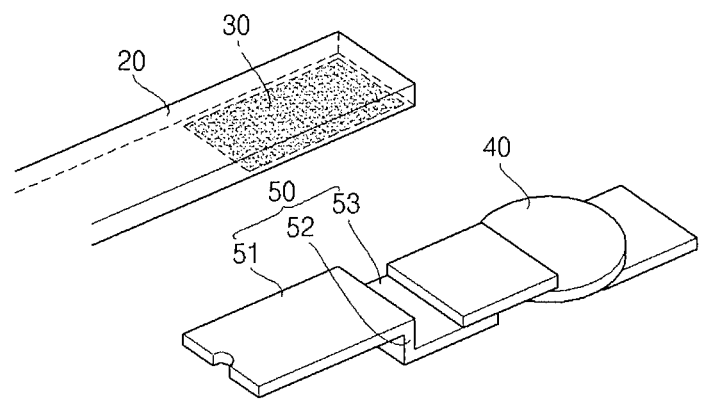
FIG. 1 is an exploded perspective detail view of a protective circuit module according to an exemplary embodiment of the present invention.
Figure 2:
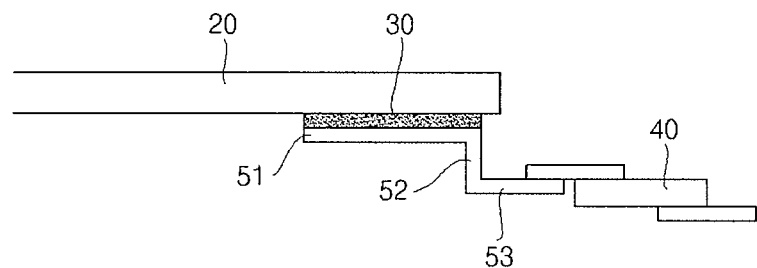
FIG. 2 is a side view of the protective circuit module of FIG. 1.

Referring now to FIGS. 1 and 2, the protective circuit board 20 comprises a protective circuit for protecting the bare cell 10 from over-charging and over-discharging, the protective circuit board 20 adapted to receive various protective elements mounted thereon.

The conductive bonding layer 30, which may comprise a thermal bonding layer, is located on a surface of the protective circuit board 20, and attaches a secondary protective element assembly including the secondary protective element 40 to the protective circuit of the protective circuit board 20, as will be described in more detail below. In one exemplary embodiment, the conductive bonding layer is softened by heating and placed in contact with a surface of the secondary protective element assembly. The conductive bonding layer is then cooled so it bonds to and becomes integral with the secondary protective element assembly. In particular, the conductive bonding layer may be, in one exemplary embodiment, formed by solder which provides excellent electrical conductivity and relatively short melting and hardening times.

As noted above, the conductive bonding layer 30 may be located between the secondary protective element 40 and the protective circuit board 20. In one exemplary embodiment, the secondary protective element 40 is a positive temperature coefficient (PTC) element commonly used as a safety feature in secondary batteries. The PTC element functions as a conductor when at an operating temperature, and ceases to function when electric resistance is increased in proportion to the increased surrounding temperature, or when the temperature of the PTC element is otherwise increased above a threshold temperature. Once the temperature of the PTC element has returned to an operating temperature, the PTC element again functions as a conductor.

The secondary protective element 40 may be electrically connected to the connecting plate 50 by a connecting member. In one exemplary embodiment, the connecting plate 50 comprises a first connecting portion 51 attached to the conductive bonding layer 30 and having a width substantially identical to or slightly narrower than a width of the conductive bonding layer 30. However, the width of the first connecting portion 51 is not limited thereto.

The connecting plate 50 may further comprise a coupling portion 52 extending at substantially a right angle between the first connecting portion 51 and a second connecting portion 53 parallel to the first connecting portion 51. As such, the second connecting portion 53 is spaced from the first coupling portion, and therefore, from the conductive bonding layer and protective circuit board, by the coupling portion 52. In one exemplary embodiment, the first connecting portion 51, the coupling portion 52 and the second connecting portion 53 are generally planar and may comprise nickel (Ni).

The first lead plate 60 connects the secondary protective element 40 with a first electrode of the bare cell 10. Accordingly, the protective circuit board 20 and the bare cell 10 are connected through the secondary protective element 40. Similarly, the second lead plate 70 connects a second electrode of the bare cell 10 to the protective circuit board 20.

Figure 3:
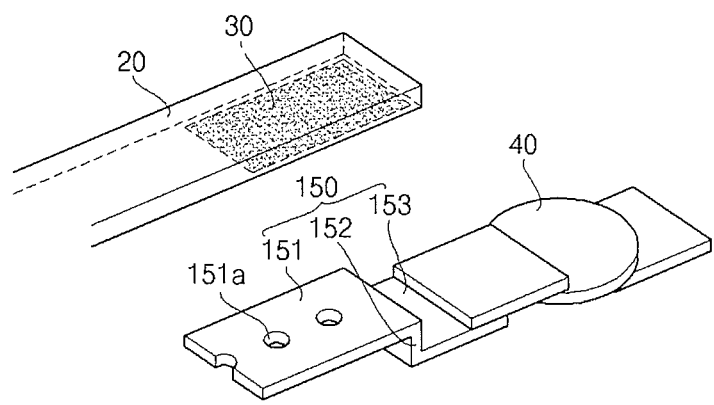
FIG. 3 is an exploded perspective detail view of a protective circuit module according to another exemplary embodiment of the present invention.
Figure 4:
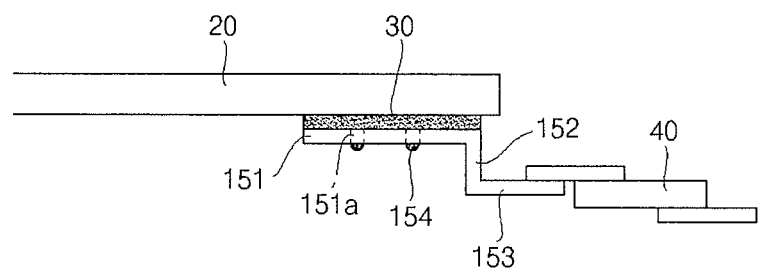
FIG. 4 is a side view of the protective circuit module of FIG. 3.

With reference now to FIGS. 3 and 4, an exemplary embodiment of a protective circuit module comprises a plurality of through holes 151a in a first connecting portion 151 of a connecting plate 150, also including a coupling portion 152 and a second connecting portion 153. Accordingly, when the connecting plate 150 is attached to the protective circuit board 20 using the conductive bonding layer 30, a portion of the conductive bonding layer 30 penetrates the through holes 151a. The bonding material which penetrates the through holes 151a is hardened to form a reinforcement protrusion 154 to reinforce the attachment of the protective circuit board to the connecting portion 151. Accordingly, the protective circuit board 20 is more securely coupled to the connecting plate 150, resulting in the secondary protective element 40 being more securely coupled to the protective circuit board 20.

The protective circuit module according to the exemplary embodiments described above may also be incorporated, for example, into a transverse-type pack secondary battery or a transverse-type inner pack.

Figure 6:
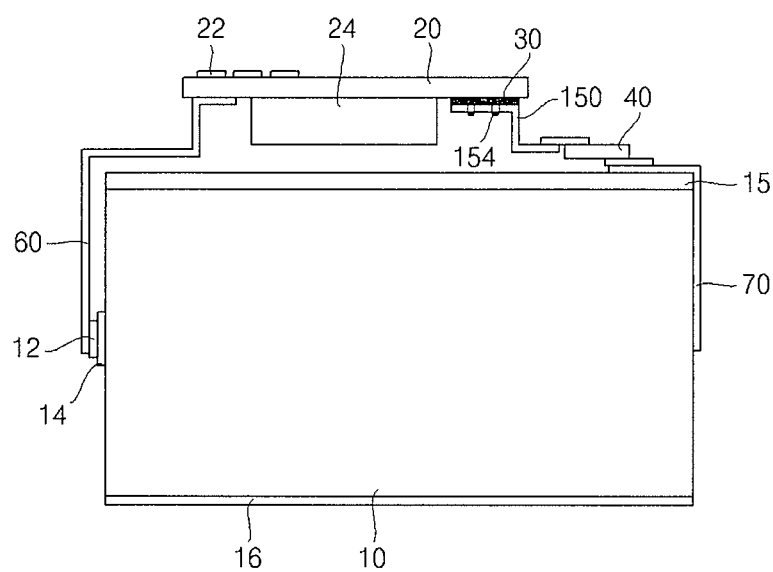
FIG. 6 is a side view of the secondary battery of FIG. 5.

With reference now to FIGS. 5 and 6, the bare cell 10 is generally rectangular having an insulated electrode terminal 12 mounted on a first side. In one exemplary embodiment, a gasket 14 is located between the bare cell 10 and the insulated electrode terminal 12. A protective circuit 24 may be mounted on the protective circuit board 20. The protective circuit board 20 may be positioned along a second side of the bare cell 10 such that the conductive bonding layer 30 is located along an interior-facing surface. The external terminals 22 are mounted on an exterior-facing surface of the protective circuit board 20 opposite the conductive bonding layer 30, and insulating members 15, 16 are secured to longitudinal sides of the bare cell 10. In one exemplary embodiment, the insulating members 15, 16 may be, for example, insulating tape or the like.

According to an exemplary construction of a secondary battery of the present invention, the secondary protective element may be fixed to the protective circuit board merely by the bonding force of the conductive bonding layer 30 between the connecting plate 50 and the protective circuit board. Accordingly, the secondary protective element can be attached to the protective circuit board without spot welding equipment, such as a welding jig, simplifying the manufacturing process. Furthermore, high temperatures produced by welding are not necessary during the attachment process, allowing the secondary protective element to be attached without being affected by such high temperatures, and thus potentially deteriorating the quality of the secondary protective element.

Although exemplary embodiments of the present invention have been described for illustrative purposes, those skilled in the art will appreciate that various modifications thereof are possible without departing from the scope and spirit of the present invention as defined in the following claims.

What is claimed is:

1. A secondary battery with a protective circuit module comprising:
   a rechargeable bare cell having a first electrode and a second electrode;
   an electrode terminal protruding from the rechargeable bare cell;
   a protective circuit board comprising a protective circuit for the rechargeable bare cell;
   a conductive bonding layer on the protective circuit board;
   a secondary protective element assembly comprising a connecting plate bonded to the protective circuit board by the conductive bonding layer;
   a first lead plate electrically connecting the secondary protective element assembly to the first electrode;
   a second lead plate directly contacting the electrode terminal and the protective circuit board to electrically connect the protective circuit board to the second electrode; and
   an insulating member secured to a longitudinal side of the rechargeable bare cell, wherein the insulating member is both between a portion of the first lead plate and the rechargeable bare cell and between a portion of the second lead plate and the rechargeable bare cell, wherein the connecting plate comprises a first connecting portion in contact with the conductive bonding layer, a coupling portion extending from the first connecting portion, and a second connecting portion substantially parallel to the first connecting portion, wherein the first connecting portion comprises a plurality of through holes allowing the conductive bonding layer to penetrate therethrough and a portion of the conductive bonding layer forming a reinforcement protrusion on a side of the first connecting portion opposite the protective circuit board.

2. The secondary battery as claimed in claim 1, wherein the conductive bonding layer comprises a thermal bonding layer.

3. The secondary battery as claimed in claim 1, wherein the conductive bonding layer comprises solder.

4. The secondary battery as claimed in claim 1, wherein the rechargeable bare cell is rectangular comprising a lateral side, wherein the electrode terminal is on the lateral side, and wherein the protective circuit board is on the longitudinal side.

5. The secondary battery as claimed in claim 1, wherein the connecting plate comprises a first connecting portion in contact with the conductive bonding layer.

6. The secondary battery as claimed in claim 1, wherein the connecting plate comprises nickel.

7. The secondary battery as claimed in claim 1, wherein the secondary protective element assembly comprises a positive temperature coefficient element.

8. The secondary battery as claimed in claim 1, wherein the protective circuit board comprises a plurality of protective circuits surface-mounted on a printed circuit board.

* * * * *

UNITED STATES PATENT AND TRADEMARK OFFICE
CERTIFICATE OF CORRECTION

| | |
|---|---|
| PATENT NO. | : 8,574,751 B2 |
| APPLICATION NO. | : 11/941041 |
| DATED | : November 5, 2013 |
| INVENTOR(S) | : Youngcheol Jang et al. |

Page 1 of 1

It is certified that error appears in the above-identified patent and that said Letters Patent is hereby corrected as shown below:

On the Title Page item (56) References Cited, Foreign Patent Documents, line 4

Delete "6/2002"
Insert -- 6/2005 -- item (74) Attorney, Agent, or Firm

Delete "Christie, Parker & Hale, LP"
Insert -- Christie, Parker & Hale, LLP --

Signed and Sealed this
Twenty-fourth Day of March, 2015

Michelle K. Lee
*Director of the United States Patent and Trademark Office*